United States Patent [19]

Robbins

[11] 4,212,389
[45] Jul. 15, 1980

[54] CARTRIDGE HAVING A SKEWED SIDE WALL FOR CONTAINING PHOTOSENSITIVE MATERIAL

[75] Inventor: Daniel H. Robbins, Rochester, N.Y.

[73] Assignee: Itek Corporation, Lexington, Mass.

[21] Appl. No.: 940,542

[22] Filed: Sep. 8, 1978

Related U.S. Application Data

[63] Continuation of Ser. No. 730,758, Oct. 6, 1976, abandoned.

[51] Int. Cl.³ .................. B65D 81/18; B65D 85/67
[52] U.S. Cl. ................... 206/316; 206/395; 206/409; 242/71.1
[58] Field of Search ............. 206/389, 409, 316, 395; 242/71.1; 354/275

[56] References Cited

U.S. PATENT DOCUMENTS

| | | | |
|---|---|---|---|
| 2,991,958 | 7/1961 | Eifrid | 206/409 X |
| 3,260,360 | 7/1966 | Davis | 206/409 X |
| 3,342,431 | 9/1967 | Mouissie | 242/71.1 X |
| 3,356,311 | 12/1967 | Winkler et al. | 242/71.1 |
| 3,854,804 | 12/1974 | McMaster | 354/275 X |
| 3,978,495 | 8/1976 | Warscheit | 354/275 X |

FOREIGN PATENT DOCUMENTS 2209191  9/1973  Fed. Rep. of Germany ........... 206/409

Primary Examiner—Stephen Marcus
Attorney, Agent, or Firm—Homer O. Blair; Robert L. Nathans; Gerald H. Glanzman

[57] ABSTRACT

A generally rectangular cartridge is provided having a substantially skewed side wall together with exit orifice means and an associated light seal positioned between a terminal portion of the skewed side wall and the adjacent wall of said cartridge. An end of roll detector is also provided, employing a movable roller which activates a microswitch when the supply of film in the cartridge becomes exhausted.

8 Claims, 4 Drawing Figures

CARTRIDGE HAVING A SKEWED SIDE WALL FOR CONTAINING PHOTOSENSITIVE MATERIAL

This is a continuation, of application Ser. No. 730,758, filed Oct. 6, 1976 now abandoned.

BACKGROUND OF THE INVENTION

The present invention relates to the field of cartridges for containing rolls of photosensitive material.

Rectangular cartridges for containing rolls of photosensitive material have been employed for many years. Such cartridges include an exit orifice positioned between a pair of perpendicular side walls, such exit orifice also including light seal means, such as a strip of felt material, for preventing light from entering the cartridge and fogging film contained therein.

In view of cost factors, it is often desirable to manufacture the cartridges out of cardboard as they are thrown away after the roll of photosensitive material is used up. After the roll of photosensitive material is inserted within the opened cardboard cartridges, the walls adjacent the above-mentioned exit orifice are folded together in order to close the light seal within the exit orifice. Since the widths between the wall members are substantially equal to the diameter of the roll of photosensitive material, there is little room within the cartridge in the neighborhood of the exit orifice to add structure for reinforcing or stiffening the terminal wall portions adjacent the exit orifice. This stiffening is often desirable in order to strengthen the overall light seal-exit orifice structure. In accordance with the present invention, a substantially skewed side wall is provided which, unlike the conventional rectangular arrangement, provides for sufficient empty space within the cartridge to accommodate such reinforcing means.

With the cartridge orientation of FIG. 1, the skewed side wall arrangement permits the roll to be inserted from the top after the elongated top wall adjacent the skewed side wall is opened. Unlike the prior art cartridge, the light seal-exit orifice structure at the top portion of the skewed side wall is displaced further away from the central core portion due to wall skewing, so that the roll may be readily dropped in from the top during assembly in the dark without having the light seal structure get in the way of the roll. In other words, the cartridge of the present invention may be loaded merely by opening the one elongated wall to provide top, or for that matter, side loading, depending upon the location of such elongated wall. In the rectangular cartridge of the prior art, this is not possible because the light seal-exit orifice structure would get in the way of the roll, unless both walls adjacent the light seal structure are opened. Thus, assembly is considerably simplified.

SUMMARY OF THE INVENTION

In accordance with preferred embodiments of the present invention, the above-mentioned benefits and advantages are obtained by providing a generally rectangular cartridge having a substantially skewed side wall adjacent the exit orifice means of the cartridge. An inexpensive and reliable end of roll detector, employing a movable roller for tripping a microswitch, is additionally employed.

Other objects, features, and advantages of the present invention will become apparent upon study of the following Detailed Description taken in conjunction with the drawings in which.

DETAILED DESCRIPTION

Figure 1:
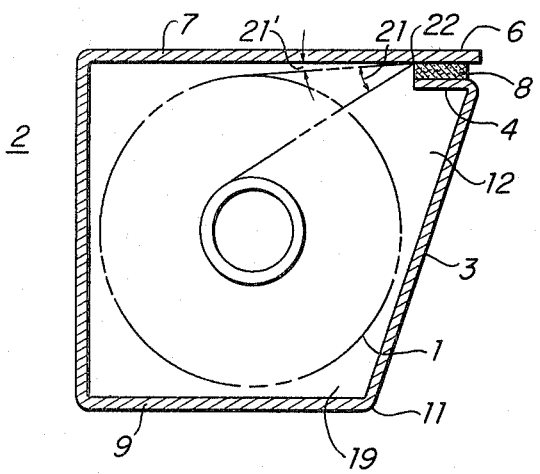
FIG. 1 illustrates a preferred embodiment of the cartridge of the present invention.
Figure 2:
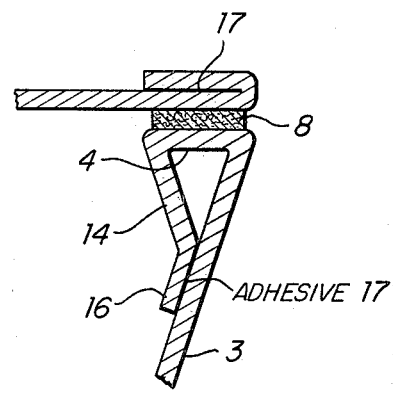
FIG. 2 illustrates a cartridge lip reinforcing structure which may be employed in conjunction with the present invention.

In FIG. 1, a cylindrical roll 1 of photosensitive material is positioned within generally rectangular cartridge 2. A substantially skewed side wall member 3 is provided, having a terminal portion 4 which is parallel to a terminal portion 6 of side wall 7, the latter having a width substantially greater than the diameter of the roll of film, in contrast with all side walls have equal widths slightly longer than the diameter of the roll in accordance with the prior art. Cartridge 1 is preferably made of cardboard in view of the desirability of cost savings and is typically assembled by folding. Portions 4 and 6 of the cartridge comprise exit orifice means which in turn includes light seal means such as an elongated strip of felt 8 which may be glued or otherwise fastened to terminal portion 4 of skewed side wall 3. Before insertion of the roll of photosensitive material, only elongated wall 7 need be bent open during assembly. A roll of material is dropped into the cartridge and wall 7 is closed. After this is accomplished, wall 3 is still substantially skewed with respect to the overall geometry of the cartridge, in contrast with the prior art, so that an additional benefit is obtained because an empty space 12 results in this novel arrangement. This empty space is large enough to be able to readily accommodate the exit orifice reinforcing structure or stiffener illustrated in FIG. 2. Unlike the arrangement illustrated in FIG. 1, the terminal portion of skewed side wall 3 is bent back on itself as illustrated to produce wall portions 14 and 16. Portion 16 may be glued, stapled, or otherwise fastened to wall portion 3 by adhesive 17. As in FIG. 1, the light seal strip 8 is glued or otherwise fastened to the terminal portion 4 of side wall 3 or if desired, to terminal portion 6 of upper wall 7. It should now be appreciated that the use of the novel skewed side wall member, unlike the prior art, provides additional empty space 12 for accommodating the FIG. 2 structure. Furthermore, the lateral displacement of the light seal away from the central roll portion, due to the skewed side wall, permits loading by bending open only the elongated wall portion adjacent the skewed side wall portion to provide for ease of assembly of the roll and cartridge. More specifically, with the orientation shown in FIG. 1, only the top wall 7 need be bent open to permit the roll to be readily dropped into the cartridge. In the absence of the skewed side wall, the light seal 8 would block insertion of the roll unless both walls 3 and 7 are simultaneously opened which is more cumbersome and time consuming during manufacturing.

Figure 3:
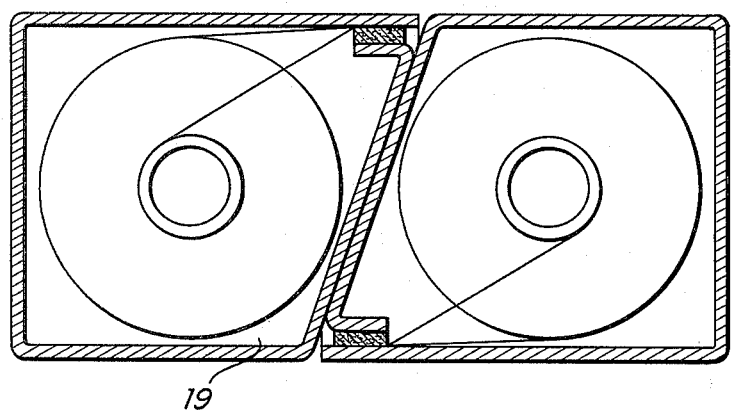
FIG. 3 illustrates the placement of two skewed cartridges together during shipment.

It is somewhat surprising that providing the skewed cartridges of the present invention does not result in the need for greater shipping space. This fact may be appreciated by examining FIG. 3 which shows two cartridges having their skewed sides positioned adjacent one another in complimentary fashion. The empty space portion 19 at the lower right-hand section of the cartridge illustrated in FIG. 1 is less than the corresponding empty space portion of the prior art, which in turn enables the upper empty space portion 12 to be made larger to accommodate the reinforcing structure described above in conjunction with FIG. 2. Yet the total volume of the cartridge of the invention need not be greater than the cartridge of the prior art.

Figure 4:
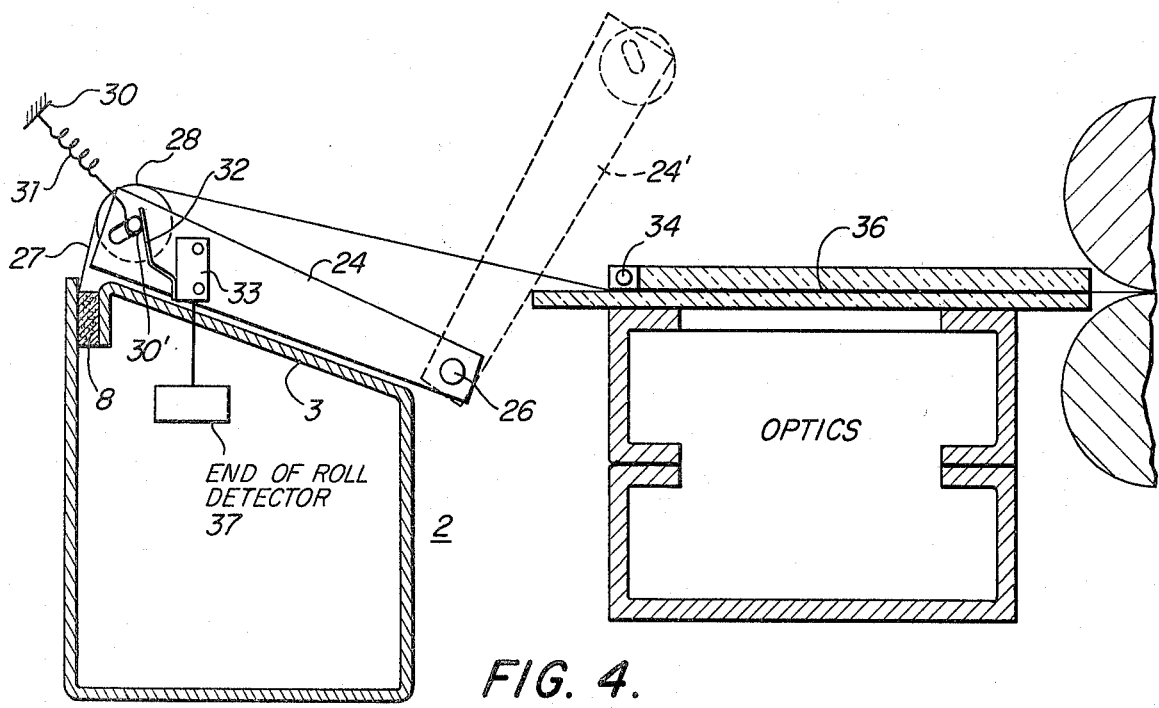
FIG. 4 illustrates peripheral equipment including an end of roll detector in conjunction with the cartridge of the present invention.

FIG. 4 illustrates a preferred film handling device which operates in conjunction with the above-mentioned novel cartridge. Cartridge 2 is positioned so that substantially skewed side wall member 3 faces in an upward direction in a machine which consumes the photosensitive material such as a phototypesetter. An elongated pivotable arm 24 pivots about pin 26 so that the arm 24 may assume the position shown in dotted lines 24' when the cartridge is inserted into the machine. The arm is thereafter lowered to the position shown, and the leader 27 is wrapped about a roller 28 positioned between the front arm 24 and a similar back arm (omitted for the sake of clarity) which may be positioned adjacent the opposite end of the cartridge. Roller means 28 preferably extends across the length of the cartridge and is rotatably supported between the pivotable arms. A single arm may be sufficient however. It is preferred that the roller means 28 be mechanically biased upwardly and to the left by spring means 31 which may be affixed to arm 24 at 30, and coupled about the roller shaft at 30' so that the roller assumes a position away from movable armature 32 of microswitch 33 before the leader is wrapped about roller 28. When leader 27 is wrapped about roller 28 and engaged by roller transport means 34 associated with exposure platen 36 of the phototypesetter, roller transport means 28 will be pushed in a direction downwardly and to the right against the action of spring means 31. This in turn causes the roller means to push against armature 32 thereby to close microswitch 33. The microswitch is coupled to an end of roll detector 37, such as a relay-pilot light combination, which becomes actuated when the roll is exhausted.

When this occurs, film is no longer present in the exit orifice, and roller 28 is no longer pushed by the film tension downwardly and to the right, and spring means 31 pulls the roller 28 upwardly and to the left to open microswitch 33, which in turn actuates the end of roll detector to inform the operator that it is now necessary to replace the cartridge. Arm 24 is pivoted to the position indicated at 24' at this time, and the cartridge is removed and thrown away. In alternate configurations, it is believed feasible to eliminate spring 31 and utilize the weight of the roller means as the mechanical biasing means where the film is oriented to support the roller against gravity.

While preferred embodiments of the invention have been described above, numerous other embodiments will be readily apparent to those skilled in the art, and it is intended that the scope of the invention be limited only by a fair reading of the claims.

The term "film" is intended to include any photosensitive material.

What is claimed is:

1. In combination:
   a. a cylindrical roll of photosensitive material having a predetermined length and diameter before the commencement of consumption thereof;
   b. a cartridge containing said roll having first, second, and third walls being substantially perpendicular to each other;
     b-1. a fourth skewed wall portion extending along the length of said roll and configured to form an obtuse angle of greater than 90° at the intersection of said first and fourth wall portions at a first cartridge portion thereof, and configured to form an angle of less than 90° at the intersection of said third and fourth wall portion at a second cartridge portion thereof, the distance between central portions of said first and third wall portions and the distance between central portions of said second and fourth wall portions both being slightly greater than said predetermined diameter of said roll of photosensitive material; and
   c. exit orifice means positioned at said second cartridge portion, the width of said first wall portion being substantially less than said predetermined diameter of said roll and the width of said third wall portion being substantially greater than said predetermined diameter of said roll.

2. The cartridge of claim 1 further including means for reinforcing said exit orifice means positioned at said second cartridge portion.

3. In combination:
   a. a cylindrical roll of photosensitive material having a predetermined length and diameter before the commencement of consumption thereof;
   b. a cartridge having first, second, and third walls being perpendicular to each other and a fourth skewed wall portion extending along the length of said roll means and configured to form an obtuse angle of substantially greater than 90° at the intersection of said first and fourth wall portions at a first cartridge portion thereof, and configured to form an angle of substantially less than 90° at the intersection of said third and fourth wall portion at a second cartridge portion thereof, the distance between central portions of said first and third walls and the distance between central portions of said second and fourth walls both being slightly greater than said predetermined diameter of said roll of photosensitive material; and
   c. exit orifice means positioned at said second cartridge portion, the width of said first wall portion being substantially less than said predetermined diameter of said roll and the width of said third wall portion being substantially greater than said predetermined diameter of said roll, so that when said cartridge is opened by displacing said third wall portion, said roll of photosensitive material may be inserted into said cartridge without being blocked by said exit orifice means position at said second cartridge portion.

4. The cartridge of claim 3 further including means for reinforcing said exit orifice means positioned at said second cartridge portion.

5. In combination:
   a. a cylindrical roll of photosensitive material having a predetermined length and diameter before the commencement of consumption thereof;
   b. a cartridge consisting essentially of:
     b-1. first, second, and third wall portions having lengths extending along the length of said roll, said first, second, and third walls being perpendicular to each other;

b-2. a fourth skewed wall portion extending along the length of said roll and configured to form an obtuse angle of substantially greater than 90° at the intersection of said first and fourth wall portions at a first cartridge portion thereof, and configured to form an angle of substantially less than 90° at the intersection of said third and fourth wall portion at a second cartridge portion thereof, the distance between central portions of said first and third walls and the distance between central portions of said second and fourth walls both being slightly greater than said predetermined diameter of said roll of photosensitive material; and c. exit orifice means positioned at said second cartridge portion, the width of said first wall portion being substantially less than said predetermined diameter of said roll, and the width of said third wall portion being substantially greater than said predetermined diameter of said roll, so that when said cartridge is opened by displacing said third wall portion, said roll of photosensitive material may be inserted into said cartridge without being blocked by said exit orifice means position at said second cartridge portion.

6. The cartridge of claim 5 further including means for reinforcing said exit orifice means positioned at said second cartridge portion.

7. In combination:

a. a cylindrical roll of photosensitive material having a predetermined length and diameter before the commencement of consumption thereof;

b. a cartridge consisting essentially of:

b-1. first, second, and third wall portions having lengths extending along the length of said roll, said first, second, and third walls being substantially perpendicular to each other;

b-2. a fourth skewed wall portion extending along the length of said roll means and configured to form an obtuse angle of greater than 90° at the intersection of said first and fourth wall portions at a first cartridge portion thereof, and configured to form an angle of less than 90° at the intersection of said third and fourth wall portion at a second cartridge portion thereof, the distance between central portions of said first and third walls and the distance between central portions of said second and fourth walls both being slightly greater than said predetermined diameter of said roll of photosensitive material; and c. exit orifice means positioned at said second cartridge portion, the width of said first wall portion being substantially less than the diameter of said roll and the width of said third wall portion being substantially greater than the diameter of said roll.

8. The cartridge of claim 7 further including means for reinforcing said exit orifice means positioned at said second cartridge portion.